_United States Patent Office_ 3,030,360
Patented Apr. 17, 1962

3,030,360
6α,16α-DIMETHYLPREGNENES AND
INTERMEDIATES
Frank H. Lincoln and William P. Schneider, Kalamazoo
Township, Kalamazoo County, and George B. Spero,
Kalamazoo, Mich., assignors to The Upjohn Company,
Kalamazoo, Mich., a corporation of Delaware
No Drawing. Filed Oct. 30, 1959, Ser. No. 849,707
9 Claims. (Cl. 260—239.55)

This invention relates to 6α,16α-dimethyl-17α,21-dihydroxy-4-pregnene-3,20-dione, 6α,16α-dimethyl-17α,21-dihydroxy-1,4-pregnadiene-3,20-dione, esters thereof, intermediates in the production thereof and a process for the production thereof.

According to this invention, 6α,16α-dimethyl-17α,21-dihydroxy-4-pregnene-3,20-dione and esters thereof are prepared by epoxidizing 3β-hydroxy-6,16α-dimethyl-5-pregnen-20-one to produce the corresponding 5α,6α-epoxide, converting the side chain to the $\Delta^{17(20)}$-21-oic acid lower-alkyl ester side chain by the steps of glyoxalating, dibrominating, and reaction with an alkali-metal lower-alkoxide in a lower-alkanol, reducing the resulting compound with lithium aluminum hydride to produce 3β,5α,21-trihydroxy - 6α,16α - dimethyl-17(20)-pregnene, selectively esterifying the 21-hydroxy group to produce a 21-acyloxy group, oxidizing the 3β-hydroxy group to a 3-keto group, oxidatively hydroxylating the $\Delta^{17(20)}$-double bond to produce a 17α-hydroxy-20-keto group, and then dehydrating the 5α-hydroxy group to produce 6α,16α - dimethyl-17α,21-dihydroxy-4-pregnene-3,20-dione 21-acylate. Reaction of this compound with selenium dioxide produces 6α,16α-dimethyl-17α,21-dihydroxy-1,4-pregnadiene - 3,20 - dione 21 - acylate. Hydrolysis of the 21-acylate group of these two compounds produces 6α,16α-dimethyl-17α,21-dihydroxy-4-pregnene-3,20-dione and 6α,16α-dimethyl - 17α,21 - dihydroxy-1,4-pregnadiene-3,20-dione, respectively.

6α,16α-dimethyl - 17α,21 - dihydroxy-4-pregnene-3,20-dione, 6α,16α - dimethyl - 17α,21 - dihydroxy-1,4-pregnadiene-3,20-dione, and the 21-esters thereof possess pharmacological activity, including glucocorticoid, anti-inflammatory and progestational activity with a minimal amount of associated mineralocorticoid activity. They can be administered in the same manner as hydrocortisone and its esters. They are also useful in the production of the corresponding 11-oxygenated compounds which also have anti-inflammatory and glucocorticoid activity, e.g., by hydroxylating with an 11β-hydroxylating species of a fungi, e.g., Cunninghamella blakesleeana, Trichothecium roseum, Curvularia lunata, Omphalia tralucida, etc., to produce 6α,16α - dimethyl-11β,17α,21-trihydroxy-4-pregnene - 3,20 - dione and 6α,16α-dimethyl-11β,17α,21-trihydroxy-1,4-pregnadiene-3,20-dione, respectively.

In carrying out the process of this invention, 3β-hydroxy-6α,16α-dimethyl-5-pregnen-20-one, which is prepared by the reaction of 3β-hydroxy-6-methyl-5,16-pregnadien-20-one with methyl magnesium bromide in the presence of cuprous chloride, is reacted with a peracid, e.g., perbenzoic or peracetic, preferably in the presence of an alkali-metal lower-acylate, e.g., potassium or sodium acetate, and preferably at or below room temperature, e.g., −30 to +30° C., for from a few minutes to several hours, to produce 3β-hydroxy-5α,6α-epoxy-6β,16α-dimethylpregnan-20-one. This compound is glyoxalated with a lower-alkyl diester of oxalic acid, e.g., methyl oxalate or ethyl oxalate, in the presence of a condensation catalyst, e.g., sodium methoxide, sodium ethoxide, sodium amide, potassium tertiary butoxide, to produce 3β-hydroxy-5α,6α-epoxy-6β,16α-dimethyl-21-lower-alkoxyoxalyl-pregnan-20-one. This compound is then dibrominated, preferably in the presence of sufficient base to absorb the hydrogen bromide produced, e.g., sodium or potassium acetate, to produce the corresponding 21,21-dibromo compound. This compound, when reacted with an alkali-metal lower-alkoxide in an alkanol, e.g., sodium methoxide in methanol or sodium ethoxide in ethanol, is converted to 3β-hydroxy-5α,6α-epoxy-6β,16α-dimethyl - 17(20) - pregnen - 21 - oic acid lower-alkyl ester as a mixture of the 17(20)-cis and trans isomers. Reduction of this compound with lithium aluminum hydride produces a mixture of the 17(20)-cis and trans isomers of 3β,5α,21-trihydroxy-6α,16α-dimethyl-17(20)-pregnene which is then oxidized, e.g., with chromic acid, chromic anhydride, N-bromoacetamide in pyridine, after selective esterification of the 21-hydroxy group under mild conditions, to produce 5α,21 - dihydroxy - 6α,16α - dimethyl-17(20)-pregnene-3-one 21-acylate. This compound is oxidatively hydroxylated with osmium tetroxide and an oxidizing agent, e.g., an amine oxide peroxide, an aryl iodo oxide, hydrogen peroxide, an alkyl peroxide or a peracid, to produce 5α,17α,21 - trihydroxy - 6α,16α - dimethylpregnane-3,20-dione 21-acylate. Reaction of this compound with a dehydrating agent, e.g., anhydrous hydrogen chloride, produces 6α,16α-dimethyl-17α,21-dihydroxy-4-pregnene-3,20-dione 21-acylate. Reaction of this compound with selenium dioxide under the usual conditions produces 6α,16α - dimethyl-17α,21-dihydroxy-1,4-pregnadiene-3,20-dione 21-acylate. Hydrolysis of this compound and 6α,16α - dimethyl - 17α,21 - dihydroxy - 4 - pregnene-3,20-dione 21-acylate, e.g., with sodium hydroxide or preferably potassium or sodium bicarbonate, is productive of 6α,16α-dimethyl - 17α,21 - dihydroxy-1,4-pregnadiene-3,20-dione and 6α,16α - dimethyl-17α,21-dihydroxy-4-pregnene-3,20-dione, respectively.

The following preparations and examples are illustrative of the process and products of the present invention, but are not to be construed as limiting.

PREPARATION 1

_3β-Hydroxy-6,16α-Dimethyl-5-Pregnen-20-one_

To a stirred mixture of 0.5 g. of cuprous chloride in 50 ml. of tetrahydrofuran was added 50 ml. of 3 M ethereal methyl magnesium bromide, followed by the dropwise addition of 5.0 g. of 3β-hydroxy-6-methyl-5,16-pregnadien-20-one (U.S. Patent 2,871,246) in 35 ml. of tetrahydrofuran. The resultant thick slurry was stirred at room temperature for 3 hours. 15 ml. of concentrated hydrochloric acid in 150 ml. of water was then added. The layers were separated, the aqueous layer was washed thoroughly with ethyl acetate and the combined organic layers were washed with water, dried and evaporated. The residue was crystallized from ethyl acetate to give 2.18 g. of 3β-hydroxy-6,16α-dimethyl-5-pregnen-20-one melting at 172–175° C.

PREPARATION 2

_3β-Hydroxy-5α,6α-Epoxy-6β,16α-Dimethylpregnan-20-one_

To an ice-cold mixture of 10 ml. of 40 percent peracetic acid and 1 g. of anhydrous sodium acetate was slowly added a solution of 5.0 g. of 3β-hydroxy-6,16α-dimethyl-5-pregnan-20-one in 90 ml. of benzene. After stirring for 2 hours in an ice bath, the layers were separated and the benzene layer was washed with water, cold aqueous 5 percent sodium hydroxide, water, dried and evaporated at reduced pressure to leave a crystalline residue of 3β-hydroxy-5α,6α-epoxy-6β,16α-dimethylpregnan-20-one. Recrystallization from acetone gave 3.89 g. of crystals thereof melting at 199–203° C., $[\alpha]_D$ +9° (CHCl₃), and having the correct elemental analysis.

Example 1

3β-Hydroxy-5α,6α-Epoxy-6,16α-Dimethyl-17(20)-pregnen-21-oic Acid Methyl Ester To a solution of 3.60 g. of 3β-hydroxy-5α,6α-epoxy-6β,16α-dimethyl-pregnan-20-one in 50 ml. of tertiary butyl alcohol was added, at 60° C. with stirring under a nitrogen atmosphere, 5.6 ml. of ethyl oxalate and 4.76 g. of 28.1 percent by weight sodium methoxide in methanol. The resulting orange colored solution was allowed to cool to room temperature and was stirred for 2 hours. Then a solution of 1.44 ml. of acetic acid and 1.66 g. of sodium acetate in 70 ml. of methanol at 10° C. was added over a period of 10 minutes. The resulting solution was cooled to 0° C. and to it was slowly added, over a period of 15 minutes, 3.2 g. of bromine in 48 ml. of cold methanol, followed by 10.7 g. of 28.1 percent by weight sodium methoxide in methanol. After stirring for 1.5 hours while warming to room temperature, 16 ml. of acetic acid and 3 g. of zinc dust was added and stirring was continued for 30 minutes. After filtering, 50 ml. of water was added to the filtrate and the mixture was concentrated at reduced pressure. The product was extracted with methylene chloride which was then washed with water, aqueous sodium bicarbonate, dried and then chromatographed on 150 g. of magnesium silicate (Florisil). 3.9 g. of 3β-hydroxy-5α,6α-epoxy-6β,16α-dimethyl-17(20)-pregnen-21-oic acid methyl ester was eluted with hexanes (Skellysolve B) plus 5 percent, 8 percent, 10 percent and 13 percent acetone. This compound showed infrared absorption peaks at 3638, 3480, 1718, 1648, 1380, 1235, 1202, 1164, 1105, 1061 and 1010 cm.$^{-1}$ Following the procedure of Example 1, but substituting sodium ethoxide in ethanol for the sodium methoxide in methanol, there is thus produced 3β-hydroxy-5α,6α-epoxy-6β,16α-dimethyl-17(20)-pregnen-21-oic acid ethyl ester.

Example 2

3β,5α,21-Trihydroxy-6α,16α-Dimethyl-17(20)-Pregnene and 21-Acetate 2.665 g. of the chromatographed 3β-hydroxy-5α,6α-epoxy-6β,16α-dimethyl-17(20)-pregnen-21-oic acid methyl ester obtained according to the procedure of Example 1, dissolved in 20 ml. of benzene, was added to 2.5 g. of lithium aluminum hydride in 30 ml. of tetrahydrofuran. The resulting suspension was stirred for 20 hours and then decomposed with ethyl acetate followed by water. The organic layer was separated, washed with dilute hydrochloric acid, aqueous sodium bicarbonate, dried and then evaporated to dryness. The residual 3β,5α,21-trihydroxy-6α,16α-dimethyl-17(20)-pregnene was dissolved in 20 ml. of dry refluxing benzene which was then cooled to room temperature and 1 ml. of pyridine followed by 0.75 ml. of acetic anhydride were added thereto. The mixture was maintained overnight at room temperature and then diluted with cold water. The organic layer was separated, washed with dilute hydrochloric acid, aqueous sodium bicarbonate, dried and evaporated to give a residue of 3β,5α,21-trihydroxy-6α,16α-dimethyl-17(20)-pregnene 21-acetate which was purified by chromatography on 200 g. of magnesium silicate. Elution was accomplished with methylene chloride plus 10 percent and 15 percent acetone. The purified product had infrared absorption peaks 3625, 1730, 1231, 1025, 952, and 820 cm.$^{-1}$ in methylene chloride.

Following the procedure of Example 2, 3β-hydroxy-5α,6α-epoxy-6β,16α-dimethyl-17(20)-pregnen-21-oic acid ethyl ester was converted to 3β,5α,21-trihydroxy-6α,16α-dimethyl-17(20)-pregnene and the 21-acetate thereof.

Similarly, 3β,5α,21-trihydroxy-6α,16α-dimethyl-17(20)-pregnene is converted to other 21-hydrocarbon carboxylic acid esters thereof by selective esterification of the 21-hydroxy group, e.g., by reaction with the appropriate acid anhydride, acid chloride or bromide, ester by ester exchange, acid in the presence of an esterification catalyst, etc. Examples of 3β,5α,21-trihydroxy-6α,16α-dimethyl-17(20)-pregnene 21-acylates prepared include those wherein the acyl group is the acyl radical of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3, or 4-methylbenzoic, 2,3-, 2,4-, 2,5-, 2,6-, 3,4- and 3,5-dimethylbenzoic, ethylbenzoic, 2,4,6 - trimethylbenzoic, 2,4,6 - triethylbenzoic, α-naphthoic, 3-methyl-α-naphthoic, an aralkyl acid, e.g., phenylacetic, phenylpropionic, diphenylacetic, triphenylacetic, a dibasic acid, (which can be converted to water soluble, e.g., sodium, salts) e.g., succinic, glutaric, α-methylglutaric, β-methylglutaric, β,β-dimethylglutaric, adipic, pimelic and suberic acid, preferably a hydrocarbon carboxylic acid containing from one to twelve carbon atoms, inclusive.

Example 3

5α,21-Dihydroxy-6α,16α-Dimethyl-17(20)-Pregnen-3-one 21-Acetate 1.188 g. of the chromatographed 3β,5α,21-trihydroxy-6α,16α-dimethyl-17(20)-pregnene 21-acetate obtained according to the procedure of Example 2 was dissolved in 100 ml. of acetone and then cooled in an ice bath. To the resulting solution was added 1.5 ml. of a solution of chromic anhydride and sulfuric acid in water [Djerassi et al., J. Org. Chem., 21, 1547 (1956)]. After stirring the mixture for 15 minutes in the ice bath, water was added. The precipitated steroid was extracted with ethyl acetate which was then washed with aqueous sodium bicarbonate, dried and evaporated. The residual 5α,21-dihydroxyl-6α,16α - dimethyl-17(20)-pregnen - 3 - one 21-acetate was chromatographed on 100 g. of magnesium silicate (Florisil) and eluted with hexanes plus 5 percent to 8 percent acetone. The purified product showed infrared absorption peaks at 3635, 1732, 1713, 1667, 1238, 1122, and 1025 cm.$^{-1}$ and, after recrystallization from a mixture of ethyl acetate and hexanes, melted at 145–155° C.

Similarly, other 21-acylates of 3β,5α,21-trihydroxy-6α,16α-dimethyl-17(20)-pregnene, e.g., wherein the acyl radical of the acylate group is that of an acid named in the paragraph following Example 2, are oxidized to the corresponding 21-acylate of 5α,21-dihydroxy-6α,16α-dimethyl-17(20)-pregnen-3-one.

Example 4

5α,17α,21-Trihydroxy-6α,16α-Dimethylpregnane-3,20-dione 21-Acetate 661 mg. of the chromatographed 5α,21-dihydroxy-6α,16α-dimethyl-17(20)-pregnen - 3 - one 21 - acetate obtained according to the procedure of Example 3 was dissolved in 50 ml. of tertiary butyl alcohol containing 0.75 ml. of pyridine and to the solution was added at room temperature 2.0 ml. of a 2.06 M solution of N-methylmorpholine oxide peroxide in tertiary butyl alcohol followed by 10 mg. of osmium tetroxide. The solution was stirred overnight and then a small amount of filter aid was added followed by 15 ml. of a solution made by dissolving 675 mg. of sodium hydrosulfite in 100 ml. of water. The mixture was stirred for one-half hour, filtered, the filtrate concentrated to a small volume by evaporation and then extracted with methylene chloride. The extracts were washed with dilute hydrochloric acid, aqueous sodium bicarbonate, dried and evaporated. The residue was chromatographed on 100 g. of magnesium silicate. 5α,17α,21-trihydroxy-6α,16α-dimethylpregnane-3,20-dione 21-acetate was eluted with hexanes plus about 12 percent acetone and gave infrared absorption peaks at 3710, 3630, 3535, 1750, 1728, 1713, 1234, 1126, 1056, 988, and 838 cm$^{-1}$ in methylene chloride. A sample thereof melting at 180–182° C. was obtained by crystallization from a mixture of hexanes and ethyl acetate.

Similarly, other 21-acylates of 5α,21-dihydroxy-6α,16α-dimethyl-17(20)-pregnen-3-one, e.g., wherein the acyl radical of the acylate group is that of an acid named in the paragraph following Example 2, are oxidatively hydroxylated to the corresponding 21-acylate of 5α,17α,21-trihydroxy-6α,16α-dimethylpregnane-3,20-dione.

EXAMPLE 5

*6α,16α-Dimethyl-17α,21-Dihydroxy-4-Pregnene-3,20-dione 21-Acetate*

267 mg. of the chromatographed 5α,17α,21-trihydroxy-6α,16α-dimethylpregnane-3,20-dione 21-acetate obtained according to the procedure of Example 4 was dissolved in 80 ml. of chloroform to which 1 ml. of ethanol was then added and the solution cooled in an ice-salt bath. Anhydrous hydrogen chloride was bubbled through the cold solution for 4 hours. Then nitrogen was bubbled through for 15 minutes and the solution was washed with aqueous sodium bicarbonate, water, dried and then evaporated. The residue was chromatographed on 75 g. of magnesium silicate. Only one peak was eluted and a total of 235 mg. of mostly crystalline material came off the column with hexanes plus about 8 percent acetone and was recrystallized from a mixture of hexanes and ethyl acetate to give 191 mg. of 6α,16α-dimethyl-17α,21-dihydroxy-4-pregnene-3,20-dione 21-acetate melting at 174–175° C. and having infrared absorption peaks in mineral oil mull at 3515, 1753, 1722, 1650, 1603, and 1240 cm.$^{-1}$.

Similarly, other 21-acylates of 5α,17α,21-trihydroxy-6α,16α-dimethylpregnane-3,20-dione, e.g., wherein the acyl radical of the acylate group is that of an acid named in the paragraph following Example 2, are dehydrated to the corresponding 21-acylate of 6α,16α-dimethyl-17α,21-dihydroxy-4-pregnene-3,20-dione.

EXAMPLE 6

*6α,16α-Dimethyl-17α,21-Dihydroxy-1,4-Pregnadiene-3,20-dione 21-Acetate*

A solution containing 200 mg. of 6α,16α-dimethyl-17α,21-dihydroxy-4-pregnene-3,20-dione 21-acetate, 0.2 g. of selenium dioxide, 10 ml. of tertiary butyl alcohol and 0.5 ml. of acetic acid was heated at reflux for a period of 8 hours. Most of the solvent was then evaporated under a stream of nitrogen. Methylene chloride was added and the solution was filtered through a bed of diatomaceous earth. The filtrate was washed consecutively with water, freshly prepared aqueous ammonium sulfide solution, dilute aqueous ammonium hydroxide solution and water. The solution was dried over magnesium sulfate and the solvent was removed by evaporation under a stream of nitrogen. The residue was dissolved in methylene chloride and chromatographed through a 10 g. magnesium silicate column packed wet with hexanes. The column was developed with hexanes containing increasing amounts of acetone to give 6α,16α-dimethyl-17α,21-dihydroxy-1,4-pregnadiene-3,20-dione 21-acetate.

Similarly, other 21-acylates of 6α,16α-dimethyl-17α,21-dihydroxy-4-pregnene-3,20-dione, e.g., wherein the acyl radical of the acylate group is that of an acid named in the paragraph following Example 2, are converted to the corresponding 21-acylate of 6α,16α-dimethyl-17α,21-dihydroxy-1,4-pregnadiene-3,20-dione.

EXAMPLE 7

*6α,16α-Dimethyl-17α,21-Dihydroxy-4-Pregnene-3,20-dione*

A solution was prepared containing 0.5 g. of 6α,16α-dimethyl-17α,21-dihydroxy-4-pregnene-3,20-dione 21-acetate in 25 ml. of methanol. This solution was purged with oxygen-free nitrogen for a period of 5 minutes and then a similarly oxygen purged solution of 0.250 g. of potassium bicarbonate dissolved in 1 ml. of methanol and 1 ml. of water was added. The mixture was maintained for 3 hours in a nitrogen atmosphere, then neutralized with hydrochloric acid, poured into 200 ml. of ice water and the thus-obtained mixture extracted with four 50 ml. portions of methylene chloride. The methylene chloride extracts were combined, washed several times with water, dried over anhydrous sodium sulfate and evaporated to give 6α,16α-dimethyl-17α,21-dihydroxy-4-pregnene-3,20-dione, M.P. 195–200° C.

Similarly, 6α,16α-dimethyl-17α,21-dihydroxy-1,4-pregnadiene-3,20-dione 21-acetate is hydrolyzed with potassium bicarbonate to 6α,16α-dimethyl-17α-21-dihydroxy-1,4-pregnadiene-3,20-dione.

We claim:

1. Compounds represented by the formula:

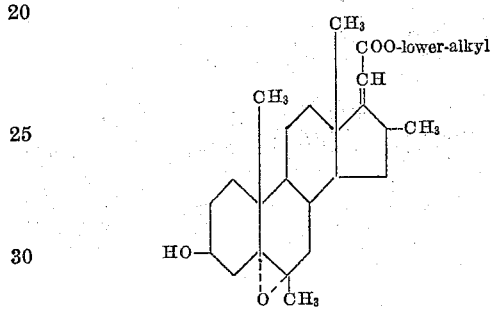

2. 3β-hydroxy-5α,6α-epoxy-6β,16α - dimethyl - 17(20)-pregnen-21-oic acid methyl ester.

3. Compounds represented by the formula:

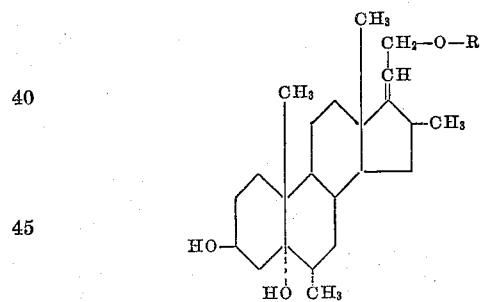

wherein R is selected from the group consisting of hydrogen and the acyl radical of a hydrocarbon carboxylic acid containing from 1 to 12 carbon atoms, inclusive.

4. 3β,5α,21-trihydroxy-6α,16α - dimethyl - 17(20)-pregnene.

5. 3β,5α,21-trihydroxy - 6α,16α - dimethyl-17(20)-pregnene 21-acetate.

6. Compounds represented by the formula:

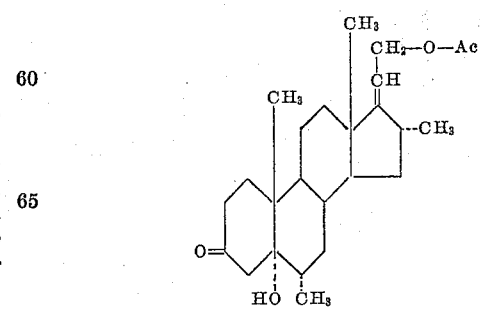

wherein Ac is the acyl radical of a hydrocarbon carboxylic acid containing from 1 to 12 carbon atoms, inclusive.

7. 5α,21-dihydroxy - 6α,16α - dimethyl-17(20)-pregnen-3-one 21-acetate.

8. Compounds represented by the formula:
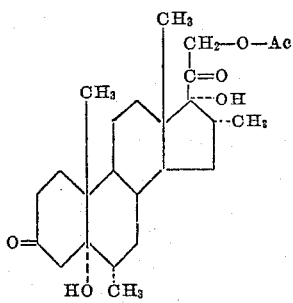
wherein Ac is the acyl radical of a hydrocarbon carboxylic acid containing from 1 to 12 carbon atoms, inclusive.
9. 5α,17α,21-trihydroxy-6α,16α-dimethylpregnane-3,20-dione 21-acetate.
References Cited in the file of this patent
UNITED STATES PATENTS
| | | |
|---|---|---|
| 2,868,808 | Babcock | Jan. 13, 1959 |
| 2,940,968 | Sletzinger et al. | June 14, 1960 |
OTHER REFERENCES
Ringold et al.: J. Am. Chem. Soc., vol. 81, pages 3712–16 (July 20, 1959).